(12) United States Patent
Franz et al.

(10) Patent No.: US 10,021,705 B2
(45) Date of Patent: Jul. 10, 2018

(54) CARRIER MEASUREMENTS FOR MULTI-CARRIER DEVICES

(71) Applicant: INTEL IP CORPORATION, Santa Clara, CA (US)

(72) Inventors: Stefan Franz, Munich (DE); Cecilia Carbonelli, Munich (DE); Sabine Roessel, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 110 days.

(21) Appl. No.: 14/794,724

(22) Filed: Jul. 8, 2015

(65) Prior Publication Data

US 2017/0013630 A1     Jan. 12, 2017

(51) Int. Cl.
*H04W 72/08* (2009.01)
*H04L 5/00* (2006.01)
*H04W 24/10* (2009.01)
*H04W 48/06* (2009.01)
*H04W 72/04* (2009.01)

(52) U.S. Cl.
CPC ........... *H04W 72/085* (2013.01); *H04L 5/00* (2013.01); *H04W 24/10* (2013.01); *H04W 48/06* (2013.01); *H04W 72/0486* (2013.01)

(58) Field of Classification Search
CPC .............. H04W 48/06; H04W 72/0486; H04W 72/085
See application file for complete search history.

(56) References Cited

U.S. PATENT DOCUMENTS

| 2012/0236832 | A1  | 9/2012  | Ogawa |
| 2012/0281563 | A1* | 11/2012 | Comsa .................. H04W 24/10 370/252 |
| 2013/0272255 | A1* | 10/2013 | Zhu ...................... H04B 7/0486 370/329 |
| 2013/0329589 | A1  | 12/2013 | Cave et al. |
| 2014/0185484 | A1* | 7/2014  | Kim ...................... H04W 24/10 370/252 |

(Continued)

OTHER PUBLICATIONS

3GPP TSG-RAN WG4—R4-145958 meeting NTT DOCOMO Oct. 6, 2014.*

(Continued)

*Primary Examiner* — Rina C Pancholi
(74) *Attorney, Agent, or Firm* — Thorpe North & Western

(57) ABSTRACT

Technology for a user equipment (UE) operable to perform carrier measurements in a wireless network is disclosed. The UE can receive, from a network element, switching parameters that indicate possible switching occasions for the UE. The UE can be configured to switch a radio frequency (RF) to another carrier frequency during the possible switching occasions in order to start performing carrier measurements or stop performing carrier measurements. The UE can send, to the network element, a switching notification that indicates an upcoming switching occasion that is selected by the UE. The switching notification can be sent in conjunction with a measurement value that indicates one or more of: selected carriers for which the UE is to start performing carrier measurements after an occurrence of the switching occasion or selected carriers for which the UE is to stop performing carrier measurements after the occurrence of the switching occasion.

21 Claims, 9 Drawing Sheets

(56) References Cited

U.S. PATENT DOCUMENTS

| | | | | |
|---|---|---|---|---|
| 2014/0341192 | A1* | 11/2014 | Venkob | H04L 5/001 370/336 |
| 2015/0016282 | A1 | 1/2015 | Su | |
| 2016/0337916 | A1* | 11/2016 | Deenoo | H04W 8/22 |

OTHER PUBLICATIONS

NTT DOCOMO et al: "Small GAP measurement in Rel-12", 3GPP Draft; R4-145958, 3$^{RD}$ Generation Partnership Project (3GPP), Mobile Competence Centre; 650, Route Des Lucioles; F-06921 Sophia-Antipolis Cedex; France vol. RAN WG4, no. Singapore; Sep. 29, 2014.

Energy-Efficient Inter-Frequency Small Cell Discovery Techniques for LTE-Advanced Heterogeneous Network Deployments; Athul Prasad, NEC Europe Ltd.; IEEE Communications Magazine; May 2013.

3GPP TSG-RAN WG4 Meeting #68bis; R4-135585; Riga, Latvia, Oct. 7-11, 2013; Operators view on: Maximum number of carriers a UE should be able to monitor for UTRA and for E-UTRA.

3GPP TR 36.839 V11.0.0 (Sep. 2012); Technical Specification Group Radio Access Network; Evolved Universal Terrestrial Radio Access (E-UTRA); Mobility enhancements in heterogeneous networks (Release 11).

3GPP TS 36.133 V11.10.0 (Sep. 2014); Technical Specification Group Radio Access Network; Evolved Universal Terrestrial Radio Access (E-UTRA); Requirements for support of radio resource management (Release 11).

3GPP TS 36.211 V11.3.0 (Jun. 2013); Technical Specification Group Radio Access Network; Evolved Universal Terrestrial Radio Access (E-UTRA); Physical Channels and Modulation (Release 11).

3GPP TS 36.213 V12.3.0 (Sep. 2014); Technical Specification Group Radio Access Network; Evolved Universal Terrestrial Radio Access (E-UTRA); Physical layer procedures (Release 11).

3GPP TS 36.521-1 V11.1.0 (Jun. 2013); Technical Specification Group Radio Access Network; Evolved Universal Terrestrial Radio Access (E-UTRA); User Equipment (UE) conformance specification Radio transmission and reception Part 1: Conformance Testing (Release 11).

3GPP TS 36.523-1 V11.6.0 (Mar. 2014); Technical Specification Group Radio Access Network; Evolved Universal Terrestrial Radio Access (E-UTRA) and Evolved Packet Core (EPC); User Equipment (UE) conformance specification; Part 1: Protocol conformance specification; (Release 11).

* cited by examiner

| Measurement Bitmap | Description | SCell2 | SCell1 | PCell |
|---|---|---|---|---|
| 0 | Stop measurement (on any active path) | 0 | 0 | 0 |
| 1 | Start measurement on PCell | 0 | 0 | 1 |
| 2 | Start measurement on SCell1 only (and stop on SCell2 if active) | 0 | 1 | 0 |
| 4 | Start measurement on SCell2 only (and stop on SCell1 if active) | 1 | 0 | 0 |
| 6 | Start measurement on SCell1 and SCell2 | 1 | 1 | 0 |

FIG. 2

| PUCCH Format | Number of Bits | Content |
|---|---|---|
| 1 | - | SR Request |
| 1a | 1 | HARQ-ACK / Scheduling Request |
| 1b | 2 | HARQ-ACK / Scheduling Request |
| 1c | 7 | HARQ-ACK / Scheduling Request / Measurement Bitmap |
| 2 | 20 | CSI / HARQ-ACK |
| 2a | 21 | CSI / HARQ-ACK |
| 2b | 22 | CSI / HARQ-ACK |
| 2c | 27 | CSI / HARQ-ACK / Measurement Bitmap |
| 3 | 48 | CSI / HARQ-ACK / Scheduling Request |
| 3a | 53 | CSI / HARQ-ACK / Scheduling Request / Measurement Bitmap |

FIG. 3

CARRIER MEASUREMENTS FOR MULTI-CARRIER DEVICES

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 illustrates a table of measurement values that can be communicated from a user equipment (UE) to a network element to indicate selected carriers for which the UE is to start or stop performing carrier measurements in accordance with an example;

FIG. 3 illustrates a table of physical uplink control channel (PUCCH) formats that can be used by a user equipment (UE) to communicate a switching notification to a network element in accordance with an example;

Figure 1:
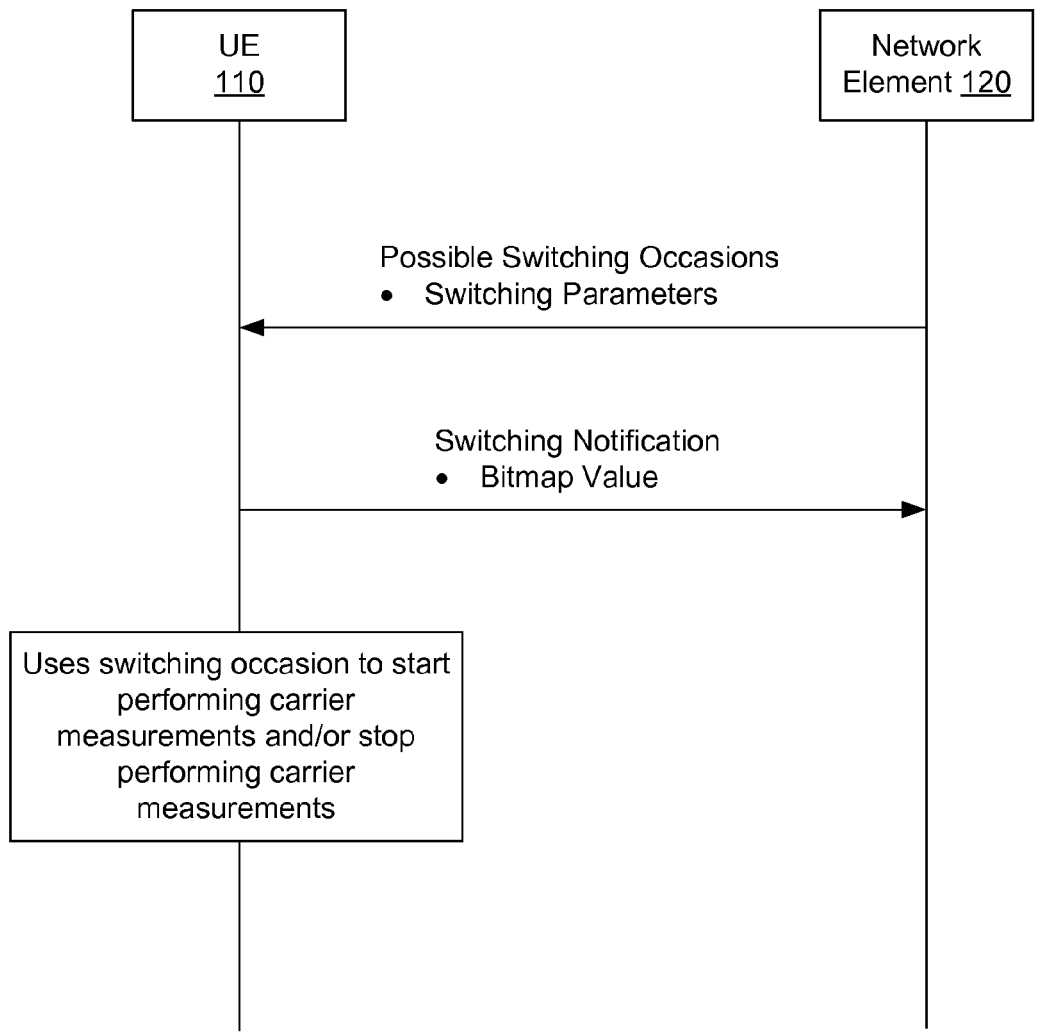
FIG. 1 is a flow diagram that depicts signaling between a user equipment (UE) and a network element to enable the UE to perform carrier measurements in a wireless network in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for enabling a user equipment (UE) to perform carrier measurements in a wireless network. The UE can be configured for carrier aggregation (CA) and receive data simultaneously from one or more carriers. In other words, the UE can support multiple radio frequency (RF) chains or receive (Rx) chains, i.e., the UE can receive data on multiple frequencies in a simultaneous manner. According to a defined periodicity, the UE can stop receiving data on one carrier or more than one carrier, and instead perform carrier measurements for a number of different carriers (e.g., cells with different frequencies). The carrier measurements can include inter-carrier measurements or intra-carrier measurements. After the UE finishes performing the carrier measurements, the UE can continue to receive data on the one carrier.

The UE can receive one or more switching parameters from the network element that indicate possible switching occasions for the UE. The possible switching occasions can indicate subframes during which the UE is able to switch a radio frequency (RF) to another carrier frequency (or frequency), so that the UE can start performing carrier measurements and/or stop performing carrier measurements. The UE can select one of the upcoming switching occasions, and send a switching notification to the network element indicating that the upcoming switching is selected by the UE. The switching notification can be a "1" if the next switching occasion is selected by the UE. The switching notification can be communicated with a measurement value that indicates the selected carriers for which the UE is to start performing carrier measurements after an occurrence of the switching occasion and/or selected carriers for which the UE is to stop performing carrier measurements after the occurrence of the switching occasion. Therefore, upon the occurrence of the switching occasion, the UE can switch to another carrier (e.g., a RF chain or receive path) or activate a carrier that is currently not being used in order to perform the carrier measurements.

A general description on carrier measurements for multi-carrier capable devices is presented. The multi-carrier capable device can be a user equipment (UE) that is configured for carrier aggregation (CA). In order to support mobility scenarios, the UE can perform carrier measurements, which can include intra-frequency and inter-frequency measurements. Carrier aggregation, which was introduced in 3GPP LTE Release 10, introduced a degree of freedom which can potentially be used to improve carrier measurement performance, although such potential has remained unused. On the other hand, carrier aggregation introduces other features that require an increased list of cells to be measured by the UE, which can increase the number of measurements to be taken at the UE.

One feature that can possibly be used to improve performance is LTE gap-less measurements, despite the increased number of measurement to be taken at the UE configured for carrier aggregation. LTE gap-less measurements was introduced in 3GPP LTE Release 8 as an optional feature. Based on capability signaling from the UE to the network, the UE can signal to the network whether or not the UE needs measurement gaps to carry out measurements on a certain band. The UE can signal to the network whether or not measurements can be performed gap-less in a certain band combination. In other words, through gap-less measurements, the UE can continue to receive data, even when measurements are being performed. The network, in theory, may not configure any measurement gaps for the band combinations indicated by the UE as not needing measurement gaps. By not configuring the measurement gaps, the UE can handle the measurements requests in a flexible manner and throughput can be improved.

However, no commercially relevant devices in the market to date are capable of performing LTE gapless measurements without constraints on the particular bands or band combinations, as such gapless measurements would require two independent modems (e.g., a baseband and RF) within a single device. Therefore, in most cases, the network is forced to configure at least a minimal amount of measurement gaps. Even if available receive paths in the modem support some gapless measurements, switching these available receive paths to a desired center frequency can cause disturbances to a primary serving cell (e.g., PCell interruptions). These interruptions can be unknown to the network since the device does not signal to the network when these interruptions occur. In addition, these interruptions can degrade network performance due to a disturbed transmission time interval (TTI) and the loss of some hybrid automatic repeat request (HARQ) processes. If the interruptions are unavoidable, the network has an interest in knowing when these disturbances are going to happen so that the network is able to adjust its scheduling.

In past solutions, the UE can perform the carrier measurements in accordance with a measurement gap pattern, which can indicate a set of consecutive subframes within a defined time period during which the UE performs carrier measurements for a selected cell. The carrier measurements can include inter-frequency and inter-radio access technology (RAT) measurements. The selected cell can be within a group of cells, wherein each cell in the group operates at a separate frequency layer and is measured using a particular measurement gap pattern. In one example, more than one cell on the same frequency can be measured, in which case measurement samples can be recorded during these gaps and then the measurement samples can be processed offline with several hypotheses for the cells. The carrier measurements for the selected cell can be reference signal received power (RSRP) measurements or reference signal received quality (RSRQ) measurements. Therefore, the UE can perform the carrier measurements for selected cells within the group of cells (each operating at a distinct frequency layer) according to the measurement gap pattern. The group of cells for which the UE performs the carrier measurements can be used for carrier aggregation or data offloading.

In past solutions, the measurement handling for devices that utilize measurement gaps to perform LTE measurements is network-centric. In other words, the UE has minimal flexibility in deciding when and for how long to measure depending on internal system states or power consumption considerations. The defined time period during which the UE performs the carrier measurement for the selected cell can be referred to as a measurement gap repetition period (MGRP). The MGRP can be 40 milliseconds (ms) or 80 ms. One subframe can correspond with 1 ms, so 40 ms corresponds with 40 subframes, and 80 ms corresponds with 80 subframes. Thus, the UE can periodically perform the carrier measurements for the selected cell every 40 or 80 milliseconds, as instructed by the network. The MGRP can vary based on a purpose of the carrier measurements. For example, if the purpose is for cell identification, the UE can perform carrier measurements for a first cell every 40 subframes. The period for which the UE performs the carrier measurements can be determined by the network. On the other hand, if the purpose is for cell measurement, the UE can perform the carrier measurements for a second cell every 80 subframes. The selected cell within the group of cells can include a macro cell, a micro cell, a pico cell or a femto cell.

In one example, the UE can switch to a different frequency (i.e., a frequency other than a serving cell frequency) for 6 ms per 40 ms to perform the carrier measurements. In other words, the UE can spend 6 ms out of every 40 ms at the different frequency (e.g., frequency 1). Alternatively, the UE can spend 6 ms per 80 ms in another frequency in order to perform the carrier measurements. When the UE measures an LTE carrier (e.g., frequency 1), the UE can capture a Primary Synchronization Signal (PSS) and a Secondary Synchronization Signal (SSS) in the 6 ms long gap, as PSS and SSS repeat every 5 ms. Also, the 6 ms long measurement gap includes enough cell-specific reference symbols for channel estimation. The 6 ms long measurement gap includes the margin for the UE to tune to the different LTE carrier (e.g., frequency 1) and revert back to the serving LTE carrier (e.g., frequency 0).

As an example, the UE can be served by a cell operating at a defined frequency (e.g., frequency 0), but the UE can periodically monitor the channel quality of other cells operating at other frequency layers. When the UE monitors the channel quality of another cell, the UE switches its frequency to match the cell for which the carrier measurements are performed (i.e., the UE can tune its receiver or oscillator to a different carrier frequency). For example, in order to perform carrier measurements for another cell operating at frequency 1, the UE has to temporarily switch its own default frequency (e.g., frequency 0) to frequency 1. When the UE completes the carrier measurements for the other cell, the UE can revert back to the default frequency (e.g., frequency 0) or switch to yet another frequency (e.g., frequency 2) associated with another cell in order to perform additional carrier measurements. In one example, the other cells can be in proximity to the UE and/or used by the UE in certain situations (e.g., for data offloading). The channel quality measured by the UE can include reference signal received power (RSRP) measurements and/or reference signal received quality (RSRQ) measurements. The RSRP and RSRQ measurements can indicate a signal strength from the other cells operating at the other frequency layers.

The carrier measurements can be facilitated by configuring certain pauses in uplink and downlink data transmission on at least one carrier and allowing the UE to perform the carrier measurements on the at least one carrier during the pause period. Such pause periods or gaps in transmission are called measurement gaps. During the measurement gaps, the UE does not transmit any data on the carrier being used to perform the carrier measurements, nor does the UE transmit Sounding Reference Signal (SRS), CQI/PMI/RI and HARQ feedback.

In past solutions, despite the availability of two or more receive chains for a CA-capable UE, the UE is not provided with the flexibility to determine when and how long to perform the carrier measurements, which can compromise performance and power consumption. In one example, this potential remains unused due to insufficient signaling support for higher order Carrier Aggregation, e.g., 3 downlink (DL) CA. If the UE is configured for 3 DL CA, then the UE can have three receive paths at the same time. A first receive path can be mapped to a primary cell (PCell), a second receive path can be mapped to a first secondary cell (SCell1), and a third receive path can be mapped to a second secondary cell (SCell2).

The UE may signal that, with the primary cell (PCell) and the first secondary cell (SCell1) active, a certain amount of frequency bands can be measured in parallel using the third receive chain. Depending on whether the SCell1 has been activated on the same component or on an alternate component, "gap-less" measurements using the third receive chain may or may not cause unwanted PCell interruptions. To avoid unwanted PCell interruptions, all receive chains can remain activated. However, this may only be possible if the frequency band to be measured is known in advance, and this configuration also leads to an intolerable increase in power consumption.

The opportunities for gap-less inter-frequency (or inter-RAT) measurements can be relatively small. Given a certain band combination, if a single frequency band to be measured is not included in a list of frequency bands ready for gap-less measurements, a measurement gap is needed, i.e., the amount of actual gap-less measurement opportunities can be relatively small. Furthermore, no signaling support exists when only a portion of a frequency band can be measured gap-less under certain carrier combination conditions. If CA is combined with LTE-LTE Dual SIM Dual active (DSDA) or LTE-LTE Dual-SIM Dual-Standby (DSDS), the network may be able to support gap-less measurements, but the related receive chains can be in use and hence may not be available. As explained in further detail below, these issues can be mitigated if measurement gap handling is device-centric rather than network-centric.

The technology described herein provides a device-centric configuration and implementation of the measurement gap in a multi-carrier capable UE. Rather than the network determining a certain measurement period and gap length (e.g., 6 ms every 80 ms) for the UE, the network can provide switching opportunities to the UE via signaling from the network to the UE. For example, the network can indicate to the UE that the switching opportunities occur every four subframes. In other words, the UE can decide (as opposed to the network) whether the UE should utilize the switching opportunity in order to start or stop performing carrier measurements. The UE can inform the network which switching opportunities the UE plans to use via signaling from the UE to the network. In addition, the UE can notify the network of which particular are to be measured by the UE after the switching opportunity arises, wherein the receive chains can be mapped to the PCell or one or more SCells. Alternatively, the UE can decide not to utilize the switching opportunity, in which case the UE does not send any signaling to the network.

The technology described herein provides a device-centric approach to performing carrier measurements, which can allow the UE to optimally manage its available resources and determine an ideal balance between measurement and throughput performance. The network-centric approach can exploit the flexibility of a CA-capable device. Specifically, when the number of active carriers for the UE is smaller than the number of available receive paths, these available receive paths can be used to perform measurements instead of remaining idle. As an example, if the UE has three RF chains, and two RF chains are receiving data (from PCell and SCell1) while the third RF chain is idle, then the third RF chain can be used to perform measurements for one or more cells. Due to a judicious use of the switching opportunities and a newly defined communication protocol between the UE and the network, the impact on the PCell can be minimized. In addition, the network can be informed about possible interruptions and is able to schedule around these interruptions.

With respect to performance, the novel signaling described herein enables the UE to determine which switching opportunity to use, or whether a particular switching opportunity should not be used. Based on the UE's ability to select which switching opportunities to use, the UE can freely configure the needed measurement intervals with the desired measurement frequency. As a result, performance criteria associated with a more heterogeneous network structure, i.e., HetNet, small cells, home eNodeB, can be satisfied.

In an exemplary deployment scenario, macro coverage has to be ensured and, at the same time, a number of small cells need to be 'measured' to enable offloading where possible. Measurement requirements for coverage and offloading are generally quite diverse. For small cell discovery, measurements are to be performed relatively often compared to coverage based handovers, and these measurements can be regarded as a sort of background activity. In addition, the delay requirements for small cell offloading can be more relaxed as compared to measurements for macro coverage.

The technology described herein has the flexibility to provide adequate intervals for small cell discovery and, at the same time, enable delay sensitive coverage layer measurements for handover when the UE reaches the edge of coverage.

As an example, a given layer (e.g., a small cell layer) or a frequency of 3 to 4 cells is to be monitored. There can be two PSS/SSS detection attempts and six measurement gaps (or sampling opportunities), which results in a total of eight gaps of 6 ms for appropriate performance accuracy. In past solutions, this measurement procedure can be ready after 7×40+6 ms=286 ms, or 7×80+6 ms=566 ms for a single frequency. These intervals become even larger if the number of carriers or cells per carrier/layer increases, as is usually the case with the introduction of carrier aggregation and the deployment of heterogeneous networks.

On the contrary, the technology described herein can allow for the measurements to be distributed over more RF chains and to conduct the measurements in parallel, which can reduce the above interval to 8×6 ms=48 ms+2 short gaps of 1 ms to enable controlled interruption of the PCell reception for a total of 50 ms per layer/frequency in this specific example, which results in a speed improvement of approximately 83%. Additional configurations with performance improvements are possible (with different resulting durations) depending on whether the UE is a 2CA or 3CA UE, and on whether only the PCell is active or an SCell is also received. In this solution, the 6 ms measurement gaps can be replaced by short gaps of 1 ms (if LTE backward compatibility is desired). Alternatively, the 6 ms measurement gaps can be replaced by short gaps even lower than 1 ms based on a 5G frame structure with reduced latency. The short gaps can be used to switch on/off the other available receive paths while measurements for a certain frequency layer are taking place in the time interval between two short gaps, wherein the duration of the interval can depend on the number of cells to be monitored.

FIG. 1 is a flow diagram that depicts signaling between a user equipment (UE) 110 and a network element 120 to enable the UE 110 to perform carrier measurements in a wireless network. The network element 120 can include a radio base station, an evolved node B (eNB), a mobility management entity (MME), a remote radio head (RRH), a relay node, a femto base station (or femto node), a pico base station (or pico node), or other suitable nodes in the wireless network. The UE 110 can be configured to support carrier aggregation (CA). In carrier aggregation, the UE 110 can receive signals from multiple bands or cells simultaneously. Carrier aggregation can be used to increase the bandwidth, and thereby the bitrate. In other words, the UE 110 can support the simultaneous reception of two or more carriers in either a contiguous intra-band CA configuration or in an inter-band CA configuration (i.e., the UE 110 can receive data at different RF frequencies).

The UE 110 can perform carrier measurements for selected cells in the wireless network for purposes of coverage or offloading. Each of the selected cells can be operating at a distinct frequency layer. Carrier measurements may be on different frequency bands or in the same frequency band. If they are on the same frequency band and two different carriers to be measured are not too far apart (e.g. confined within 20 MHz), the two carriers might be measured without retuning. Inter-frequency measurements can be performed when the UE 110 tunes its local oscillator to a different frequency, and the UE 110 measures the different frequency. For example, the UE 110 can receive data on frequency 1 (F1), and then measure frequency 2 (F2), wherein F2 is different than F1. Intra-frequency measurements can be performed when the UE 110 stays on the same frequency. For example, the UE 110 can perform intra-frequency measurements on the same frequency, but for cells with different IDs.

In one example, the UE 110 can perform carrier measurements on potential cells that are available for purposes of handover. Based on various parameters of the cell indicated by the carrier measurements, such as signal-to-noise ratio (SNR) of the cell, the UE 110 can decide which cell should be a target cell during handover. The other cell can operate on a different frequency or frequency band. The UE 110 can perform the measurements based on a list of frequencies and frequency bands that is received at the UE 110 from higher layers. In order to perform the carrier measurements, the UE 110 can tune its oscillator to a different frequency and measure that particular frequency.

In one example, the carrier measurements performed at the UE 110 can be mobility measurements or secondary cell measurements. The carrier measurements can include intra-RAT measurements, which can occur when the UE 110 searches for a Global System for Mobile Communications (GSM) or 3G/4G/5G cells because LTE coverage for the UE 110 comes to an end. In addition, the carrier measurements can be for other measurement purposes in 5G networks. For example, the carrier measurements can be for detection of interference in ad hoc networks, device-to-device (D2D) networks, detection of violation of shared access to spectrum, etc.

Since the UE 110 is configured for carrier aggregation, the carriers for which the UE performs the carrier measurements can include a primary cell and a plurality of secondary cells (e.g., four secondary cells). As a non-limiting example, the UE 110 can be connected to a primary cell (PCell), a first secondary cell (SCell1) and a second secondary cell (SCell) through carrier aggregation. The UE 110 can receive data on the PCell and SCell1, and use SCell 2 to perform carrier measurements. As another example, the UE 110 can receive data on PCell, and perform carrier measurements on SCell1 and SCell 2.

The network element 120 can send one or more switching parameters to the UE 110. The switching parameters can indicate possible switching occasions for the UE 110, wherein the possible switching occasions can be subframes during which the UE 110 is able to switch to one or more carriers in order to start performing carrier measurements or stop performing carrier measurements. As an alternative to subframes, the switching occasions can occur at certain frames or slots. In other words, at the switching occasion, the UE 100 can switch the RF chain or receive path in order to perform the carrier measurements. For example, during a particular switching occasion, the UE 110 can start performing carrier measurements for selected cell(s) on PCell, SCell1 and/or SCell2. At another switching occasion, the UE 110 can stop performing carrier measurements for the selected cell(s) on the PCell, SCell1 and/or SCell2. Therefore, the UE 110 can ultimately decide when and how often to perform the carrier measurements, as opposed to the network element 120 dictating when and how often the UE 110 is to perform carrier measurements, as in previous solutions. Based on this flexibility, the UE 110 can determine whether to use particular switching occasions or not use particular switching occasions in order to optimize performance and power consumption at the UE 110.

In order to notify the UE 110 of the possible switching occasions, the network element 120 can send the switching parameters to the UE 110. The switching parameters can indicate a period and an offset relative to a system frame number, thereby indicating when the possible switching occasions occur. The switching parameters sent from the network element 120 to the UE 110 can include a measurement gap period, which can indicate a periodicity or how often the possible switching occasions occur. The measurement gap period can range from 4 subframes to 127 subframes. The switching parameters sent from the network element 120 to the UE 110 can include a measurement gap offset, which can indicate the offset relative to the system frame number. The measurement gap offset can range from 0 subframes to 126 subframes. Based on the measurement gap period and the measurement gap offset, the network element 120 can inform the UE 110 where the switching notifications occur and how often they repeat. As a non-limiting example, the network element 120 can inform the UE 110 that the switching notifications take place every four subframes starting from subframe number 1 of frame 1.

In one example, the switching parameters sent from the network element 120 to the UE 110 can include a measurement advance, which can indicate how many subframes in advance the UE 110 is to notify the network element 120 before using a particular switching occasion. The measurement advance can range from 8 subframes to 80 subframes based on a number of reasons. For example, if there are large down-streams or up-streams with quality of service (QoS) guaranteed bit rates involved, the network scheduler metrics may need additional time to compensate for the increased load. In this case, the network element 120 can set one or more carriers being used by the UE 110 to "not ready for scheduling". Scheduling is the process through which the network element 120 decides which UEs should be given resources to send or receive data. Therefore, a pre-notification or measurement advance of at least 8 ms before the next switching occasion is desirable so that the network element 120 has the opportunity to decline the UE's indicated switching occasion (at least for the time being) until the scheduling congestion has been mitigated. In another example, the measurement advance can be in between 8 subframes and 80 subframes in order to allow a service-oriented and/or a configuration-oriented notification range in the presence of Voice over LTE (VoLTE) discontinuous reception (DRX) and/or semi-persistent scheduling (SPS) patterns. Both the switching occasions and the notification range are to be suitable to the DRX and/or SPS patterns. In this case, it may be desirable to have the switching occasions every 20 or 40 ms and a pre-warning or measurement advance of up to 80 ms.

In one configuration, the switching parameters (i.e., the measurement gap period, measurement gap offset, and measurement advance) can be programmed in a semi-static manner. For example, the switching parameters can be defined and communicated to the UE 110 when the UE 110 enters a coverage area of a cell in the wireless network. In one example, the network element 120 can send the one or more switching parameters indicating the possible switching occasions to the UE 110 via radio resource control (RRC) signaling. Based on the switching parameters, the UE 110 can know when the switching occasions are available.

In one example, the UE 110 can use the switching occasion to switch to a receive path not currently being used for data reception in order to perform carrier measurements for one or more carriers using that receive path. Even though the UE 110 can be configured for carrier aggregation, the UE 110 may not always be receiving data on multiple receive chains. There can be times when the UE 110 receives data on a single carrier (or a single receive path), such that other carriers or receive paths or unused or idle. Therefore, the UE 110 can use the unused receive path(s) to perform the carrier measurements. In general, the three or four different carriers supported by the UE 110 may only be used at the same time for very specific band combinations.

As a non-limiting example, the UE 110 can be connected to a primary cell (PCell) and a secondary cell (SCell1). The UE 110 can receive data on the PCell, but not the SCell1. In other words, the receive path associated with the SCell1 is not currently be used for data reception. Therefore, the UE 110 can use the SCell1 to perform carrier measurements for a plurality of other cells for offloading purposes. For example, while the UE 110 is receiving data on the PCell, the UE 110 can perform carrier measurements (e.g., frequency measurements) for f2, f3 and f4 using the other receive path that would be associated with SCell1.

In one configuration, the UE 110 can send a switching notification to the network element 120 that indicates an upcoming switching occasion that is selected by the UE. In other words, the UE 110 can notify the network element 120 that the UE 110 plans to use the next switching occasion for performing carrier measurements. For example, the switching notification can be a "1" to indicate that the UE 110 plans to use the next switching occasion. As previously explained, the UE 110 can send the switching notification approximately 8 subframes before an occurrence of the selected switching occasion. In one configuration, the UE 110 can send the switching notification to the network element 120 via radio resource control (RRC) signaling. In an alternative configuration, the UE 110 can send the switching notification to the network element 120 using a media access control (MAC) control element (CE) in uplink or by sending a switching notification on the PHY layer.

In one configuration, the switching notification communicated from the UE 110 to the network element 120 can be sent in conjunction with a measurement value indicating selected carriers for which the UE is to start performing carrier measurements after an occurrence of the switching occasion. In addition, the measurement value can indicate selected carriers for which the UE is to stop performing carrier measurements after the occurrence of the switching occasion. The measurement value can also be referred to as a measurement bitmap. Based on the measurement value, the network element 120 can learn how the UE 110 is using the switching occasion (i.e., which cell(s) the UE is planning to measure or stop measuring after the switching occasion occurs). Specific examples of the measurement value are provided in FIG. 2.

In one configuration, the switching notification can be sent from the UE 110 to the network element 120 via RRC signaling. In this case, the measurement advance may be greater than 8 ms due to RRC reconfiguration delays. In an alternative configuration, the UE 110 can send the switching notification to the network element 120 via a media access control (MAC) control element (CE). If MAC CEs are used to send the switching notification, then there is no need to allow for RRC reconfiguration delays, and the network element 120 can react within a minimum UE-to-eNB communication delay of 4 ms. Therefore, in this case, the measurement advance can be less than 8 ms.

In one configuration, in order for the UE 110 to inform the network element 120 about the usage of individual switching occasions (i.e., via the measurement value), the UE 110 can send a set of Nca bits to the network elements 120, wherein the Nca bits comprise the measurement value that describes the UE's use of the next switching opportunity. In one example, Nca can refer to the number of carriers supported by the UE 110. For example, if the UE 110 supports 3-CA, then Nca can be equal to 3. In addition, each bit can be set to "1" or a "0" based on the measurement value. Specific examples of the Nca bits and corresponding measurement values are provided in FIG. 2. If the next switching occasion is not going to be used by the UE 110, then the UE 110 does not need to signal anything to the network element 120 with respect to the switching occasions.

In one example, the signaling of the switching notification from the UE 110 to the network element 120 is not semi-static, but rather is dynamically decided by the UE 110. Therefore, the UE 110 can signal the switching notification via a physical uplink control channel (PUCCH) or a physical uplink shared channel (PUSCH) if an uplink (UL) grant is available. In particular, the switching notification that is sent in conjunction with the measurement value can be sent using a newly defined PUCCH format or using the PUSCH.

In one example, if an UL grant is available, all control UL information can be transmitted from the UE 110 on the PUSCH instead of the PUCCH. Similarly, the additional Nca bits (e.g., 5 Nca bits) that comprise the measurement value can be mapped to the PUSCH and transmitted in uplink. If the measurement value is sent to the network element 120 on the PUSCH, then one additional valid bit is needed to indicate that the Nca=5 bits reserved in the PUSCH are valid. Alternatively, the Nca bits that comprise the measurement value can be sent to the network element 120 using the newly defined PUCCH format. In one example, the newly defined PUCCH format or the valid bit in the PUSCH is only set if the UE 110 sends the measurement value to the network element 120, and only in those subframes that correspond to a switching occasion indicated by the network element 120.

In one configuration, the UE 110 can send the switching notification to the network element 120, and in response, the network element 120 can send a denial message to the UE 110. In other words, the network element 120 can prohibit the UE 110 from using the indicated switching occasion to switch carriers in order to start or stop performing carrier measurements. In other words, the denial message can indicate that the UE 110 is barred from switching carriers upon the occurrence of the indicated switching occasion due to the scheduling congestion. The network element 120 can send the denial message to the UE 110 due to scheduling congestion (or other types of congestion) in the wireless network. The network element 120 can send the denial message to the UE 110 via a media access control (MAC) control element (CE) or by sending a switching notification on the PHY layer.

After a certain period of time, the network element 120 can detect when the network congestion has reduced. The network element 120 can send a notification to the UE 110 indicating that the network congestion has reduced and the UE 110 is now permitted to send switching notifications to the network element 120. The network element 120 can send the notification using an additional MAC CE or by sending a notification on the PHY layer, or by RRC signaling. Based on the UE 110 receiving the notification from the network element 120, the UE 110 can send an additional switching notification to the network element 120. In other words, only after the UE 110 receives the notification indicating that the UE 110 is allowed to resume switching occasions again, the UE 110 can send another switching notification to the network element 120.

FIG. 2 illustrates an exemplary table of measurement values that can be communicated from a user equipment (UE) to a network element to indicate selected carriers for which the UE is to start or stop performing carrier measurements after an occurrence of a switching occasion. The measurement value can be combined with a switching notification and sent from the UE to the eNB. The UE can plan to perform the carrier measurements indicated in the measurement value corresponding to the indicated switching occasion (e.g., 8 subframes after the UE sends the switching notification to the network element). The measurement value can also be referred to as a measurement bitmap. In one configuration, the UE can be a 3CA UE, which means that the UE is configured for carrier aggregation (CA) and can be simultaneously connected to up to three carriers. For example, the UE can be connected to a primary cell (PCell), a first secondary cell (SCell1) and a second secondary cell (SCell2). Alternatively, the UE can be connected to less than three carriers at the same time; in the specific case of intra-band contiguous carrier aggregation, the UE may also be connected to more than three carriers.

As shown in FIG. 2, a measurement value of 0 can indicate to stop measurements on any active path with respect to the SCell2, Scell1 and PCell. The measurement value of 0 can be communicated using three Nca bits of "0, "0," and "0". A measurement value of 1 can indicate to start measurements on the PCell only. The measurement value of 1 can be communicated using three Nca bits of "0, "0," and "1". A measurement value of 2 can indicate to start measurements on SCell1 only and stop measurements on SCell2 if active. The measurement value of 2 can be communicated using three Nca bits of "0, "1," and "0". A measurement value of 4 can indicate to start measurements on SCell2 only and stop measurements on SCell1 if active. The measurement value of 4 can be communicated using three Nca bits of "1, "0," and "0". A measurement value of 6 can indicate to start measurements on SCell1 and SCell2. The measurement value of 6 can be communicated using three Nca bits of "1, "1," and "0". A measurement value of 7 can indicate to start measurements on the PCell, SCell1 and SCell2. The measurement value of 7 can be communicated using three Nca bits of "1, "1," and "1".

FIG. 3 illustrates an exemplary table of physical uplink control channel (PUCCH) formats that can be used by a user equipment (UE) to communicate a switching notification to a network element, such as an evolved node B (eNB). The switching notification can be combined with a measurement value that indicates selected carriers for which the UE is to start performing carrier measurements after an occurrence of a switching occasion and/or selected carriers for which the UE is to stop performing carrier measurements after the occurrence of the switching occasion. In one example, the measurement value can five bits (i.e., Nca=5), which indicates that the UE supports the simultaneous connection to five separate carriers (e.g., a primary cell and up to four secondary cells) via carrier aggregation.

In one example, the UE can send the measurement value to the network element using PUCCH format 1c. PUCCH format 1c can be a total of 7 bits. PUCCH format 1c can be used to transmit the measurement value (or measurement bitmap), in addition to a hybrid automatic repeat request (HARQ) acknowledgement (ACK) and a scheduling request. In another example, the UE can send the measurement value to the network element using PUCCH format 2c. PUCCH format 2c can be a total of 27 bits. PUCCH format 2c can be used to transmit the measurement value (or measurement bitmap), in addition to channel state information (CSI) and a HARQ-ACK. In yet another example, the UE can send the measurement value to the network element using PUCCH format 3a. PUCCH format 3a can be a total of 53 bits. PUCCH format 3a can be used to transmit the measurement value (or measurement bitmap), in addition to CSI, a HARQ-ACK, and a scheduling request.

Figure 4:
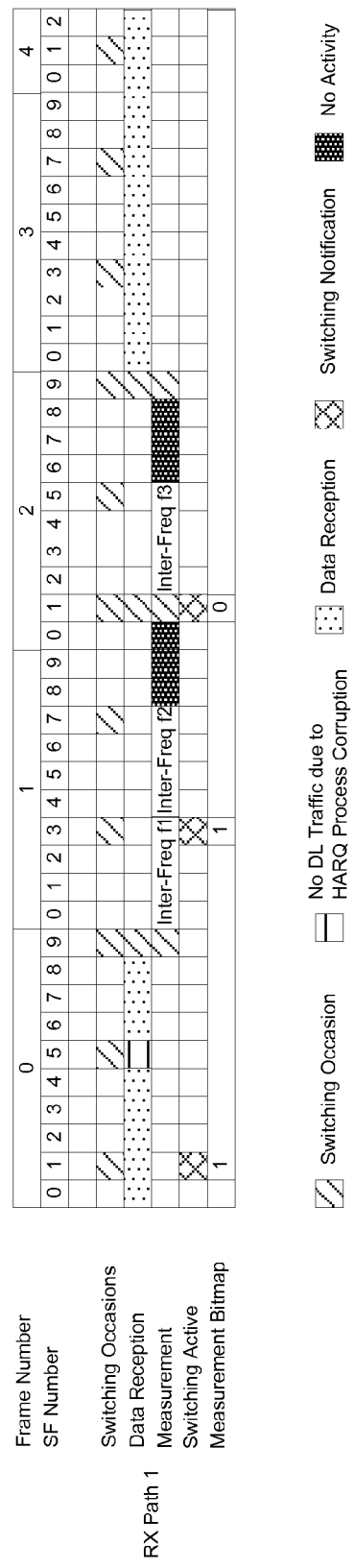
FIG. 4 illustrates a carrier measurement and data reception pattern for a user equipment (UE) in accordance with an example.

FIG. 4 illustrates an exemplary carrier measurement and data reception pattern for a user equipment (UE). The network can provide switching occasions to the UE in the form of short gaps. As an example, a radio base station or an evolved node B (eNB) can provide the switching notifications to the UE. The switching occasions can occur each X subframes and have a duration of Y milliseconds, wherein X and Y are integers. These short gaps enable the UE to switch on or off certain receive paths (or RF chains). Although interference can occur during the switching occasions, the network can know about the interference ahead of time and schedule accordingly. In one example, the network can configure the switching occasions via radio resource control (RRC) signaling. As previously discussed, the network can configure the switching occasions by sending various parameters to the UE, such as the measurement gap period, the measurement gap offset, and the measurement advance.

In the example shown in FIG. 4, the UE can be a 1-CA UE. In other words, the UE can have a single receive path (i.e., RX Path 1). The UE can be connected to a single carrier, such as a primary cell (PCell), and receive data from that single carrier. The switching occasions can occur every four subframes (or 4 ms) and have a duration of 1 subframe (or 1 ms). Thus, the network can configure a repetition period of 4 subframes. In addition, the network can configure an offset of 1 subframe since the first switching subframes occurs in subframe #1 in frame #0. As long as these switching occasions are not used by the UE, a continuous PCell reception can be maintained (i.e., no gap is present in the transmission).

If the UE desires to perform an RF switching (i.e., switch to a different carrier or RF chain) in order to carry out carrier measurements, the UE can send a switching notification to the network that indicates an upcoming switching occasion the UE plans to use for performing the carrier measurements. The UE can notify the network in advance of when the switching occasion occurs in accordance with the measurement advance previously received from the network. In other words, the UE can send a pre-warning to the network indicating the switching occasion that is selected by the UE. The network may have previously configured the measurement advance (e.g., 8 subframes) based on the network scheduler's constraints. As an example, if the UE sends a switching notification to the network, then the UE can plan to use a switching occasion that occurs approximately 8 subframes later in time as compared to the subframe used to send the switching notification. During a subframe where the UE is switching the carrier or RF chain (i.e., at the switching occasion), the network does not schedule any downlink (DL) traffic to the UE.

In one example, the measurement advance or pre-warning time is sufficiently large to allow the network to stop scheduling the UE several subframes in advance, which can avoid the corruption of hybrid automatic repeat request (HARQ) processes around the switching subframe. As shown in FIG. 4, DL subframes where no DL traffic can be scheduled due to HARQ process corruption can occur between the switching occasions (e.g., approximately every 8 subframes). In one example, if the UE is scheduled to receive DL data in subframe n, then the UE can send an ACK or NACK in the uplink in subframe (n+4), so that the base station knows that the UE has decoded the DL data correctly. As shown in FIG. 4, if the network knows that the UE is to use the switching occasion in frame #0, subframe #9, then the UE is not able to send ACK/NACK information in uplink in that subframe. Therefore, the network may not schedule DL data to the UE in frame #0, subframe #5, as the ACK/NACK information is unable to be sent to the network.

In one example, the UE has a single receive path available (i.e., a single receive path that is mapped to the PCell), so the UE will have to interrupt any DL traffic on the receive path when performing carrier measurements. The UE can adhere to a measurement advance time (or pre-warning time) of 8 subframes. In other words, the UE is to indicate any switching activity to the network at least 8 subframes before performing the switching activity. Besides indicating which switching opportunities are used by the UE, the UE can also inform the network how exactly the UE plans to use the switching occasions. For example, the UE can send a measurement value or a measurement bitmap to the network indicating which carrier measurements are to be performed after the switching occasion occurs. This indication allows the network to determine whether or not to interrupt DL data for the UE on a particular receive path during a measurement period, as the UE decides (rather than the network) on how many internal receive chains the UE carries out the measurements and for how long the measurements are to be performed. This is in contrast to previous solutions, in which the network dictates the carrier measurements that are performed at the UE.

As shown in FIG. 4, the UE can receive data on the receive path (e.g., a receive path mapped to a PCell). In subframe #1 of frame #0, the UE can send a switching notification to the network along with a measurement value of 1. The measurement value of 1 can indicate that the UE, at the next possible switching occasion, is to start performing measurements on the receive path. The next possible switching occasion is in accordance with the measurement advance, so in this case, the switching occasion occurs after 8 subframes. At the switching occasion (i.e., subframe #9 of frame #0), the UE switches to another carrier frequency, at which time the UE can start performing inter-frequency measurements at a first frequency (F1). For example, F1 can be associated with a first cell. The UE does not receive data during the switching occasion. The UE can perform the measurements using a PCell receive chain. Based on the measurement advance of 8 subframes, the UE can send the measurement value to the network 8 subframes before the UE starts to switch the RF to the first frequency (F1).

The UE can spend 4 subframes performing the measurements for F1. The UE can measure a second frequency (F2) after completing the measurements for F1. F2 can be associated with a second cell. In this case, the UE can perform the measurements for F2 without switching the RF. Therefore, the UE does not indicate any switching activity to the network. The UE can spend 4 subframes performing the measurements for F2.

At the completion of the measurements for F1, the UE can send another switching notification to the network along with a measurement value of 1. The measurement value of 1 can indicate that, in 8 subframes, the UE plans to use an upcoming switching occasion in order to start a measurement on the PCell. This measurement can correspond to a third frequency (F3). F3 can be associated with a third cell. In this example, in order to measure F3, the UE needs to switch the RF at the switching occasion, thus indicating the switching activity to the network prior to carrying out the measurements for F3. After the UE measures F3, no additional measurement tasks are scheduled at the UE. The UE can send another switching notification along with a measurement value of 0, which indicates that the UE wishes to stop performing measurements on any active path. At this time, the network can continue to schedule DL data for the UE on the receive path. However, the UE may have to wait a certain period of time until the next available switching occasion (during which no measurement activity is performed) in order to continue receiving DL data on the receive path. The UE can switch back to receiving DL data on the receive path approximately 8 subframes after sending the measurement value of 0 to the network.

Figure 5:
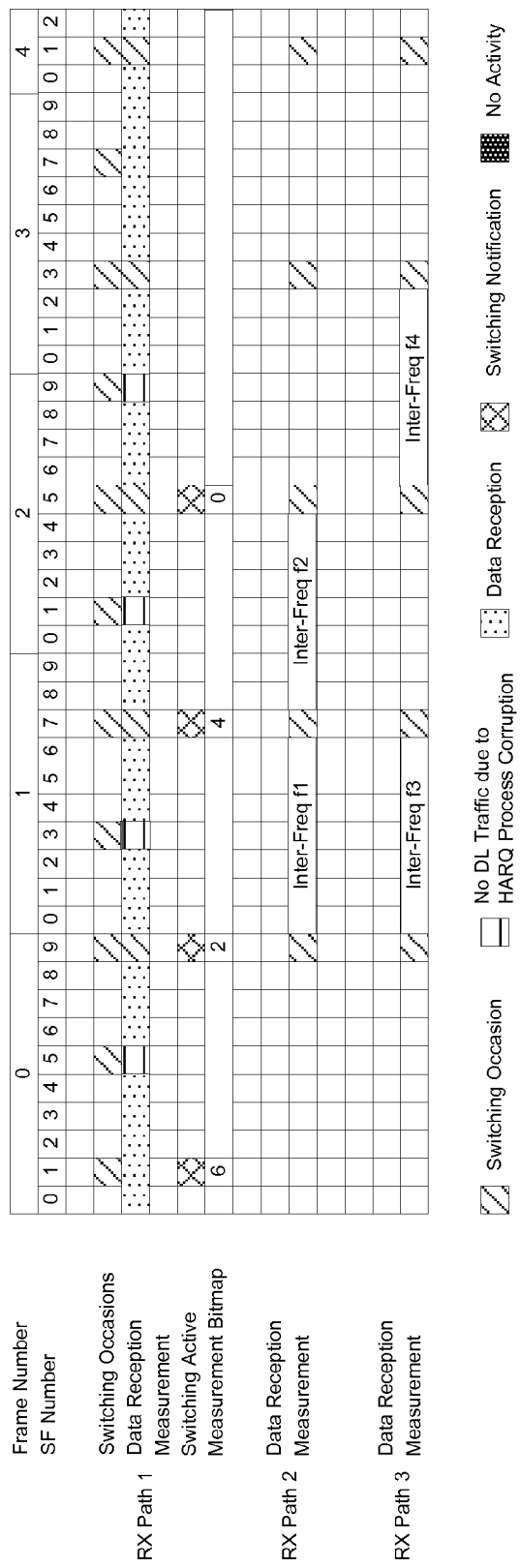
FIG. 5 illustrates a multi-carrier measurement and data reception pattern for a user equipment (UE) configured for carrier aggregation (CA) in accordance with an example.

FIG. 5 illustrates an exemplary carrier measurement and data reception pattern for a user equipment (UE) configured for carrier aggregation (CA). In this example, the UE can be a 3-CA UE. In other words, the UE can be connected to a first receive path (i.e., RX path 1), a second receive path (i.e., RX path 2) and a third receive path (i.e., RX path 3). In one example, the first receive path can be mapped to a primary cell (PCell), the second receive path can be mapped to a first secondary cell (SCell1), and the third receive path can be mapped to a second secondary cell (SCell2). The UE can receive data on the first receive path (which is mapped to the PCell) and perform SCell1 and SCell2 secondary cell measurements. The switching occasions can occur every four subframes (or 4 ms) and have a duration of 1 subframe (or 1 ms).

The UE can determine whether or not DL data on the first receive path is interrupted for the duration of the measurements being performed on second receive path and third receive path In this case, the UE can determine to perform the measurements on the second receive path and the third receive path without interrupting the first receive path data reception (i.e., PCell data reception) during the measurements. Therefore, other than switching occasions and subframes that coincide with HARQ process corruption, the UE can continually receive DL data on the PCell.

The UE can send a switching notification to the network (e.g., a radio base station) along with a measurement value of 6, which indicates that the UE plans to start performing measurements on the second receive path (corresponding to SCell1) and the third receive path (corresponding to SCell2) in parallel. The UE can start performing the measurements 8 subframes after sending the switching notification. The UE can perform measurements for a first frequency (F1) and a third frequency (F3) in parallel, wherein F1 is associated with a first cell and F3 is associated with a third cell. The UE can measure F1 on the second receive path (corresponding to SCell1) and the UE can measure F3 on the third receive path (corresponding to SCell2). After measuring F1 and F3, the UE can switch the RF to measure a second frequency (F2) on the second receive path (corresponding to SCell1), wherein F2 is associated with a second cell. Prior to measuring F2, the UE can send a measurement value of 2, which indicates that the UE plans to start performing F2 measurements on the second receive path (corresponding to SCell1) and the UE plans to stop performing F1 measurements on the second receive path (corresponding to SCell1) if active.

In this example, it is assumed that a fourth frequency (F4) cannot be measured in parallel to F2 due to front-end limitations. F4 can be associated with a fourth cell. Therefore, after measuring F2 on the second receive path (which corresponds to SCell1), the UE switches its RF, such that the UE is able to measure F4 on the third receive path (which corresponds to SCell2). Prior to measuring F4, the UE can send a measurement value of 4, which indicates that the UE plans to start performing measurements on the third receive path for F4 (i.e., the UE plans to start measuring F4) and the UE plans to stop performing measurements on the second receive path for F2 if active (i.e., the UE plans to stop measuring F2). After the UE measures F4, the UE can send a measurement value of 0 (8 ms prior to the next switching occasion) to indicate that the UE has finished performing the measurements (i.e., the UE plans to stop performing measurements on any active path).

Figure 6:
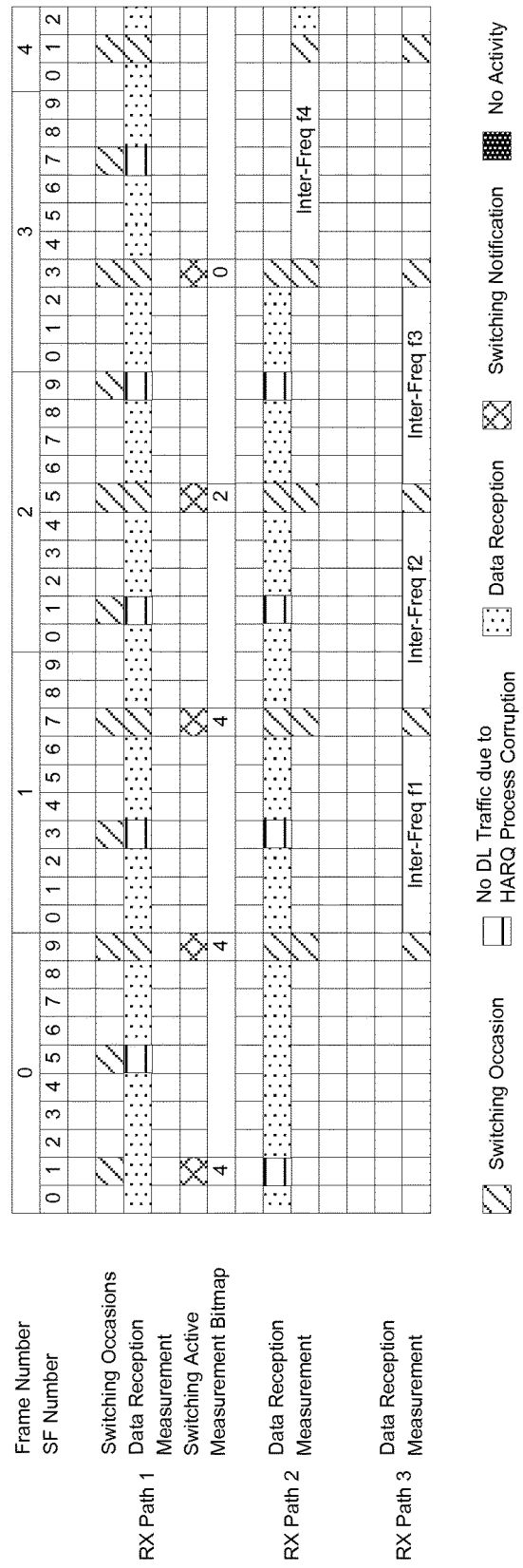
FIG. 6 illustrates a multi-carrier measurement and data reception pattern for a user equipment (UE) configured for carrier aggregation (CA) in accordance with an example.

FIG. 6 illustrates an exemplary carrier measurement and data reception pattern for a user equipment (UE) configured for carrier aggregation (CA). In this example, the UE can be a 3-CA UE. In other words, the UE can be connected to a first receive path (i.e., RX path 1), a second receive path (i.e., RX path 2) and a third receive path (i.e., RX path 3). In one example, the first receive path can be mapped to a primary cell (PCell), the second receive path can be mapped to a first secondary cell (SCell1), and the third receive path can be mapped to a second secondary cell (SCell2). So, the UE can be connected to a PCell and Scent while the third receive path is "idle" and not connected to any SCell. Or, the UE is connected to a PCell and two secondary cells, but on the receive path bound to SCell2 there is currently no data reception. In both cases the "idle" receive path(s) can be used for performing carrier measurements. The switching occasions can occur every four subframes (or 4 ms) and have a duration of 1 subframe (or 1 ms).

In this example, the UE can receive DL data on the first receive path (which corresponds to the PCell) and the second receive path (which corresponds to SCell1). The UE can send a switching notification to the network along with a measurement value of 4, which indicates the UE plans to start performing measurements on the third receive path (or SCell2) and stop performing measurements on the second receive path (or SCell1) if active. However, in this case, the receive path for SCell1 is not performing measurements when the switching notification is sent to the network. Therefore, the UE can perform measurements for a first frequency (F1). After F1 is measured, the UE can switch the RF at the next possible switching occasion and then perform measurements for a second frequency (F2). After F2 is measured, the UE can switch the RF at the next possible switching occasion and then perform measurements for a third frequency (F3). F1, F2 and F3 can be associated with a first cell, a second cell and a third cell, respectively. The UE can perform all of the measurements for F1, F2 and F3 on the receive path bound for SCell2. The UE can also send measurement values of 4 to the network prior to starting the measurements for F2 and F3.

In this example, a fourth frequency (F4) associated with a fourth cell cannot be measured in combination with data reception on SCell1 (e.g., due to front-end restrictions). Therefore, the UE needs to measure F4 on the receive path for SCell1. Prior to the UE performing the measurements for F4, the UE can signal to the network to interrupt data reception on the second receive path (or SCell1) during frame #2. For example, the UE can send a measurement value of 2, which indicates that the UE plans to start performing measurements on the receive path currently bound to SCell1 (i.e., the UE plans to start measuring F4) and the UE plans to stop performing measurements on the receive path currently bound to SCell2 if active (i.e., the UE plans to stop measuring F3). The UE can perform measurements for F4 on the receive path for SCell1, and afterwards signal to the network to continue with the DL traffic on receive path bound to the SCell1 by sending a measurement value of 0 to the network.

As previously explained, the measurement value can be composed of N bits, wherein N is an integer. Each bit can be a "1" or a "0," wherein a "1" indicates that a particular component carrier (e.g., PCell or SCellx) is used for measurements and a "0" indicates that a particular component carrier is not used for measurements. If the Nth bit is set to 0, then the network may or may not schedule DL traffic on that particular DL carrier. In one example, the measurement value can be transmitted to the network in the UL in conjunction with the switching notification. The switching notification can be a "0" or a "1" to indicate whether the next possible switching occasion is going to be used by the UE. In some cases, the UE can only send a switching notification of "1". In other words, if the UE does not plan to use an upcoming switching occasion, the UE does not have to send a message to the network.

Figure 7:
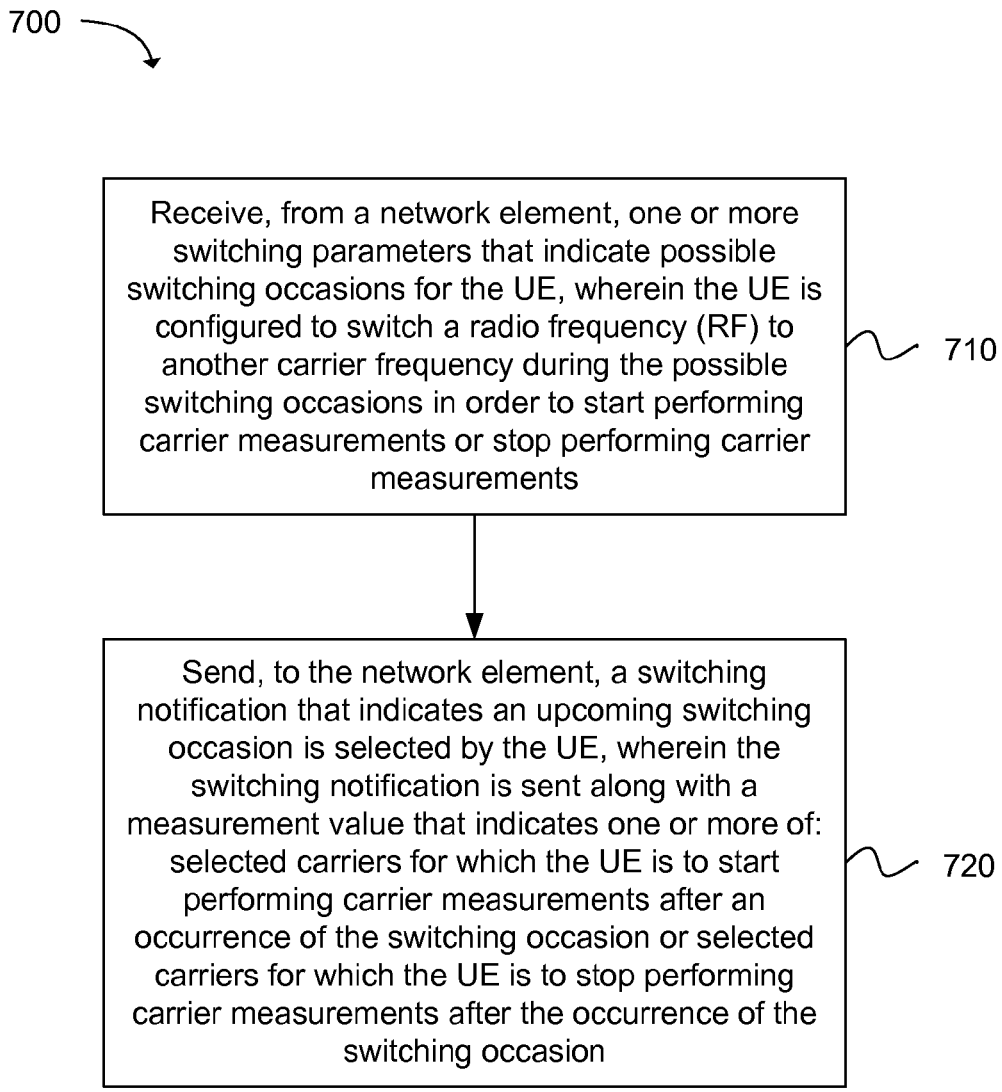
FIG. 7 depicts functionality of a user equipment (UE) operable to perform carrier measurements in a wireless network in accordance with an example.

Another example provides functionality 700 of a user equipment (UE) operable to perform carrier measurements in a wireless network, as shown in the flow chart in FIG. 7. The functionality can be implemented as a method or the functionality can be executed as instructions on a machine, where the instructions are included on at least one computer readable medium or one non-transitory machine readable storage medium. The UE can include one or more processors configured to receive, from a network element, one or more switching parameters that indicate possible switching occasions for the UE, wherein the UE is configured to switch a radio frequency (RF) to another carrier frequency during the possible switching occasions in order to start performing carrier measurements or stop performing carrier measurements, as in block 710. The UE can include one or more processors configured to send, to the network element, a switching notification that indicates an upcoming switching occasion is selected by the UE, wherein the switching notification is sent in conjunction with a measurement value that indicates one or more of: selected carriers for which the UE is to start performing carrier measurements after an occurrence of the switching occasion or selected carriers for which the UE is to stop performing carrier measurements after the occurrence of the switching occasion, as in block 720.

In one example, the one or more switching parameters received from the network element include a measurement gap period, a measurement gap offset, or a measurement advance parameter. In one example, the one or more processors are configured to receive the one or more switching parameters indicating the possible switching occasions from the network element via radio resource control (RRC) signaling. In one example, the one or more processors are configured to receive the one or more switching parameters indicating the possible switching occasions from the network element when the UE enters a coverage area of a cell in the wireless network.

In one example, the one or more processors are configured to send, from the UE, the switching notification to the network element using a media access control (MAC) control element (CE) in uplink. In one example, the one or more processors are configured to send, from the UE, the switching notification to the network element via radio resource control (RRC) signaling. In one example, the one or more processors are configured to send, from the UE, the switching notification to the network element in uplink using a defined physical uplink control channel (PUCCH) format or a physical uplink shared channel (PUSCH).

In one example, the carrier measurements include inter-carrier measurements or intra-carrier measurements. In one example, the UE is configured for carrier aggregation and the carriers for which the UE performs the carrier measurements on at least one and possibly more receive paths. In one example, the UE uses the switching occasion to switch to a receive path not currently being used for data reception in order to perform carrier measurements for one or more carriers using that receive path.

In one example, the one or more processors are further configured to: receive a denial message from the network element via a media access control (MAC) control element (CE) in response to the switching notification sent from the UE to the network element, wherein the denial message prohibits the UE from using the switching occasion indicated in the switching notification, wherein the denial message is received at the UE during scheduling congestion at the network element. In one example, the one or more processors are further configured to: receive a notification from the network element after the scheduling congestion has reduced, the notification indicating that the UE is permitted to select switching occasions; and send an additional switching notification to the network element.

Figure 8:
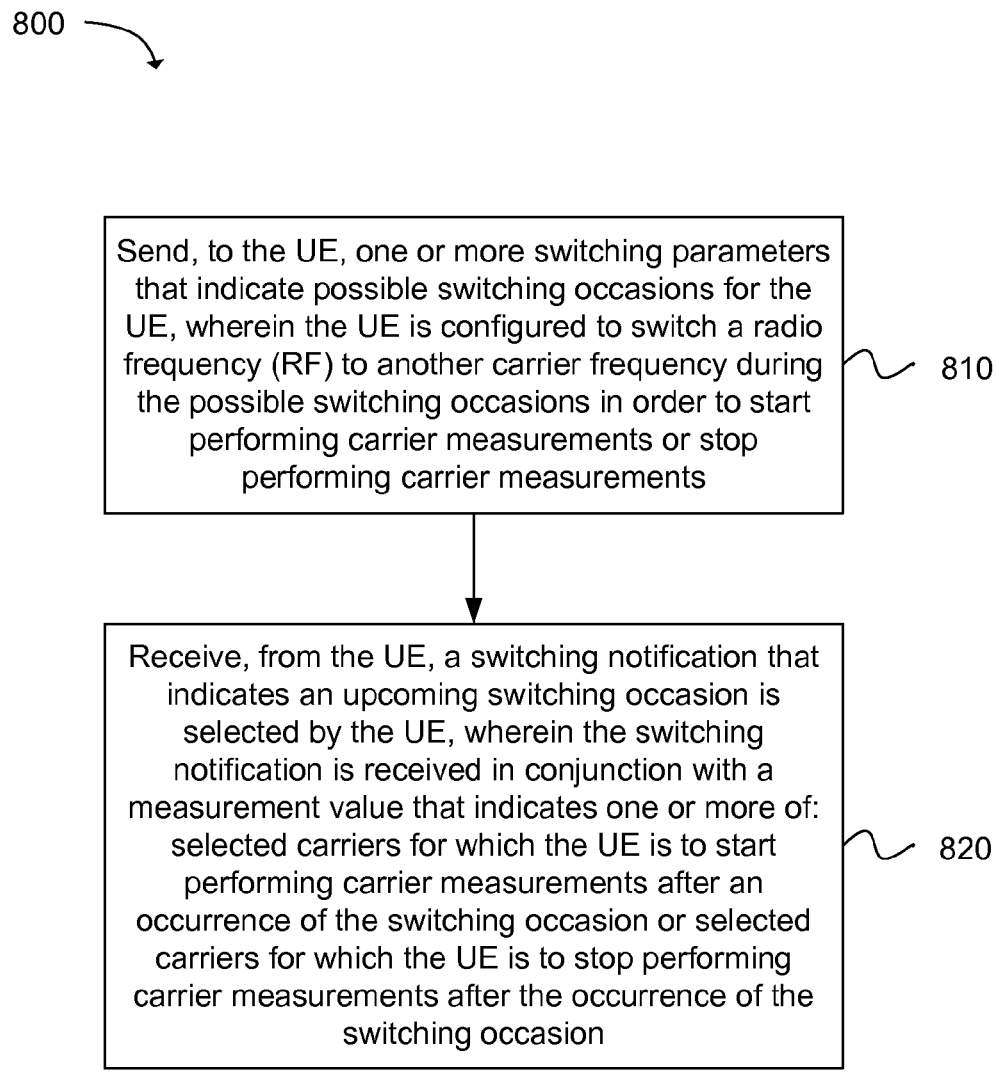
FIG. 8 depicts functionality of a radio base station operable to assist a user equipment (UE) in performing carrier measurements in a wireless network in accordance with an example.
Figure 9:
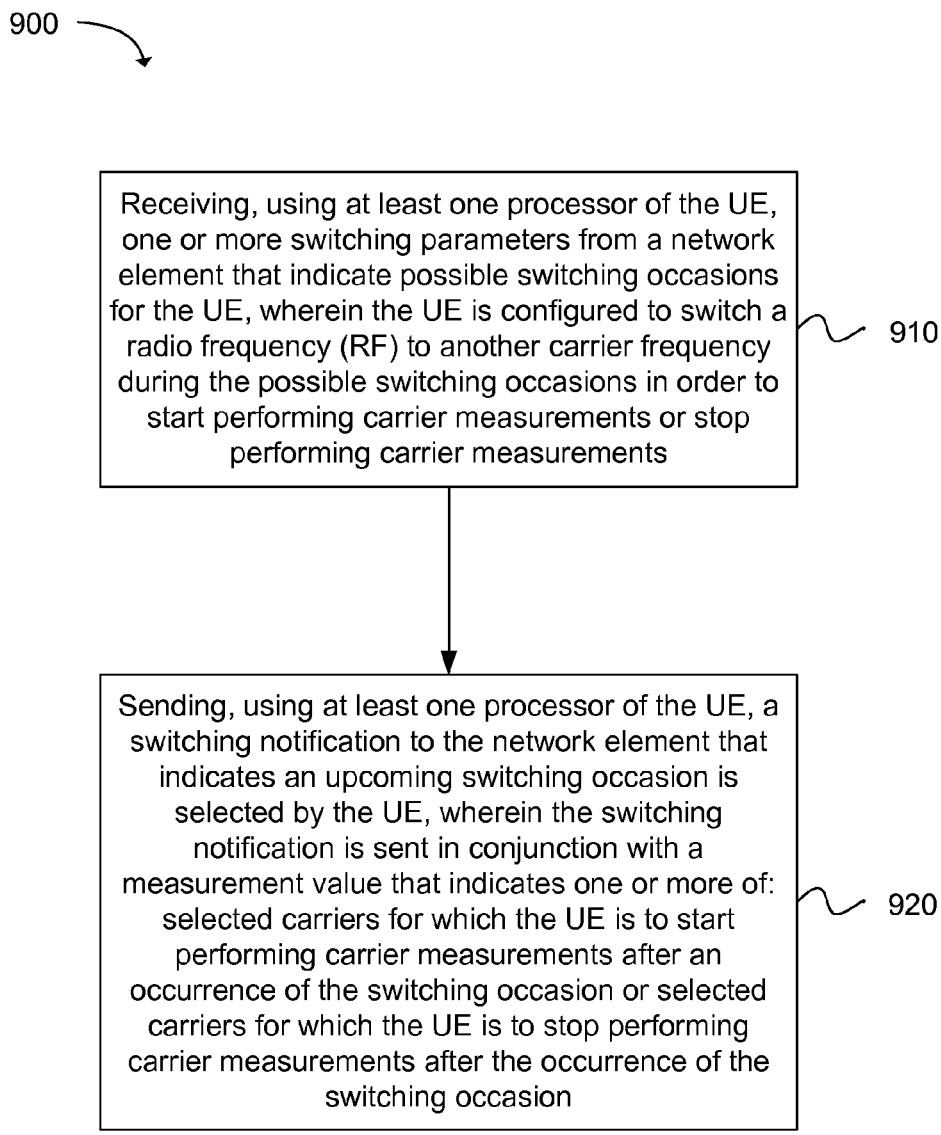
FIG. 9 depicts a flow chart of at least one non-transitory machine readable storage medium having instructions embodied thereon for performing carrier measurements at a user equipment (UE) in accordance with an example.

Another example provides functionality 800 of a radio base station operable to assist a user equipment (UE) in performing carrier measurements in a wireless network, as shown in the flow chart in FIG. 8. The functionality can be implemented as a method or the functionality can be executed as instructions on a machine, where the instructions are included on at least one computer readable medium or one non-transitory machine readable storage medium. The radio base station can include one or more processors configured to send, to the UE, one or more switching parameters that indicate possible switching occasions for the UE, wherein the UE is configured to switch a radio frequency (RF) to another carrier frequency during the possible switching occasions in order to start performing carrier measurements or stop performing carrier measurements, as in block 810. The radio base station can include one or more processors configured to receive, from the UE, a switching notification that indicates an upcoming switching occasion is selected by the UE, wherein the switching notification is received in conjunction with a measurement value that indicates one or more of: selected carriers for which the UE is to start performing carrier measurements after an occurrence of the switching occasion or selected carriers for which the UE is to stop performing carrier measurements after the occurrence of the switching occasion, as in block 820.

In one example, the one or more processors are further configured to: send a denial message to the UE indicating that the UE is barred from switching between carriers when the switching occasion occurs due to the scheduling congestion, wherein the denial message is sent to the UE via a media access control (MAC) control element (CE); and send an additional message via an additional MAC CE to the UE when the network congestion has reduced and the UE is now permitted to send switching notifications to the radio base station.

In one example, the one or more processors are configured to send the one or more switching parameters indicating the possible switching occasions to the UE via radio resource control (RRC) signaling. In one example, the one or more processors are configured to send the one or more switching parameters indicating the possible switching occasions to the UE when the UE enters a coverage area of a cell in the wireless network.

In one example, the one or more processors are configured to receive the switching notification from the UE via a media access control (MAC) control element (CE). In one example, the one or more processors are configured to receive the switching notification from the UE via radio resource control (RRC) signaling. In one example, the one or more processors are configured to receive the switching notification from the UE via a physical uplink control channel (PUCCH) or a physical uplink shared channel (PUSCH).

Another example provides functionality 900 of at least one non-transitory machine readable storage medium having instructions embodied thereon for performing carrier measurements at a user equipment (UE). The instructions, when executed, can cause the UE to perform receiving, using at least one processor of the UE, one or more switching parameters from a network element that indicate possible switching occasions for the UE, wherein the UE is configured to switch a radio frequency (RF) to another carrier frequency during the possible switching occasions in order to start performing carrier measurements or stop performing carrier measurements, as in block 910. The instructions, when executed, can cause the UE to perform sending, using at least one processor of the UE, a switching notification to the network element that indicates an upcoming switching occasion is selected by the UE, wherein the switching notification is sent in conjunction with a measurement value that indicates one or more of: selected carriers for which the UE is to start performing carrier measurements after an occurrence of the switching occasion or selected carriers for which the UE is to stop performing carrier measurements after the occurrence of the switching occasion, as in block 920.

In one configuration, the at least one non-transitory machine readable storage medium can comprise instructions which when executed by the at least one processor of the UE performs the following: receiving the one or more switching parameters indicating the possible switching occasions from the network element via radio resource control (RRC) signaling, wherein the one or more switching parameters include a measurement gap period, a measurement gap offset, or a measurement advance parameter.

In one configuration, the at least one non-transitory machine readable storage medium can comprise instructions which when executed by the at least one processor of the UE performs the following: sending the switching notification to the network element using a media access control (MAC) control element (CE) or via radio resource control (RRC) signaling. In one example, the UE uses the switching occasion to switch to a receive path not currently being used for data reception in order to perform carrier measurements for one or more carriers using that receive path.

Figure 10:
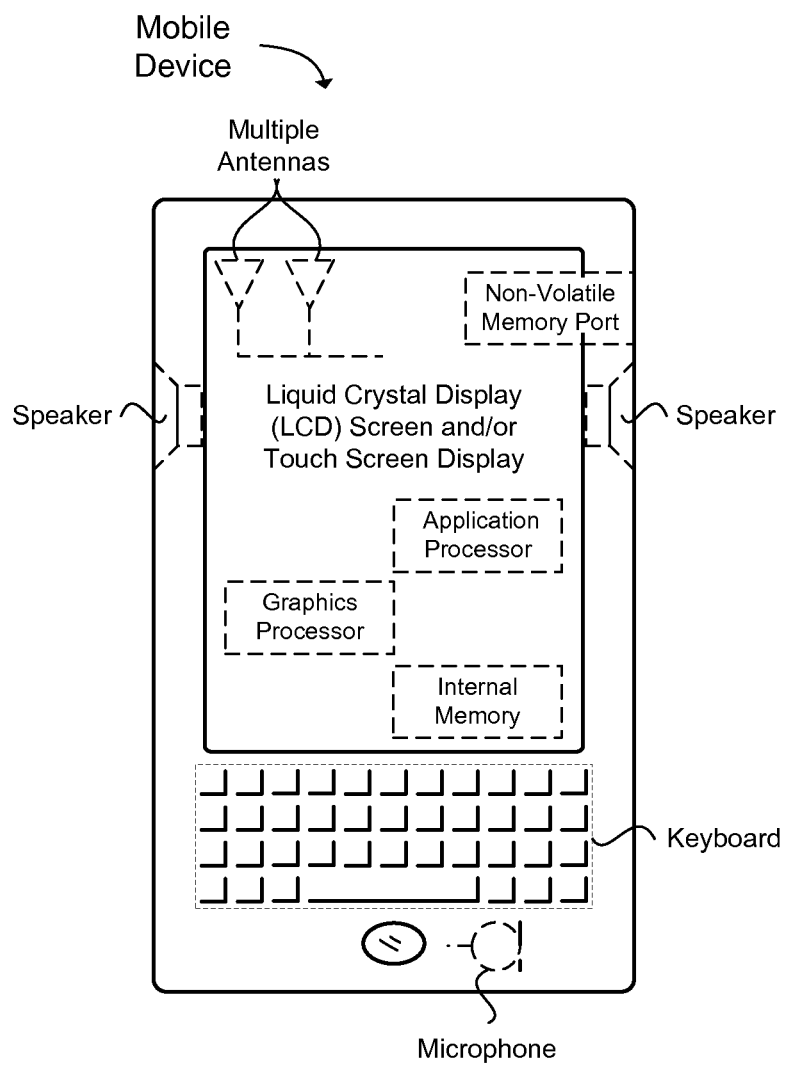
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present technology. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to perform carrier measurements in a wireless network, the apparatus comprising:

memory; and one or more processors configured to:

receive, from a network element, switching parameters that indicate possible switching occasions for the UE, wherein the UE is configured to switch a radio frequency (RF) to another carrier frequency during the possible switching occasions in order to start performing the carrier measurements or stop performing the carrier measurements, wherein the switching parameters include a measurement gap period indicating a periodicity of the possible switching occasions, a measurement gap offset indicating an offset relative to a system frame number, and a measurement advance parameter that defines a number of subframes in advance that the UE is to notify the network element before using an upcoming switching occasion; and send, to the network element, a switching notification that indicates the upcoming switching occasion from the possible switching occasions is selected by the UE, wherein the switching notification is sent in conjunction with a measurement value that indicates to the network element one or more of: selected carriers for which the UE is to start performing the carrier measurements after an occurrence of the upcoming switching occasion or selected carriers for which the UE is to stop performing the carrier measurements after the occurrence of the upcoming switching occasion.

2. The apparatus of claim 1, wherein the one or more processors are configured to receive the switching parameters indicating the possible switching occasions from the network element via radio resource control (RRC) signaling.

3. The apparatus of claim 1, wherein the one or more processors are configured to receive the switching parameters indicating the possible switching occasions from the network element when the UE enters a coverage area of a cell in the wireless network.

4. The apparatus of claim 1, wherein the one or more processors are configured to send, from the UE, the switching notification to the network element using a media access control (MAC) control element (CE) in uplink.

5. The apparatus of claim 1, wherein the one or more processors are configured to send, from the UE, the switching notification to the network element via radio resource control (RRC) signaling.

6. The apparatus of claim 1, wherein the one or more processors are configured to send, from the UE, the switching notification to the network element in uplink using a defined physical uplink control channel (PUCCH) format or a physical uplink shared channel (PUSCH).

7. The apparatus of claim 1, wherein the carrier measurements include inter-carrier measurements or intra-carrier measurements.

8. The apparatus of claim 1, wherein the UE is configured for carrier aggregation and carriers for which the UE performs the carrier measurements include a primary cell and a plurality of secondary cells.

9. The apparatus of claim 1, wherein the UE uses the upcoming switching occasion to switch to a receive path not currently being used for data reception in order to perform the carrier measurements for one or more carriers using that receive path.

10. The apparatus of claim 1, wherein the one or more processors are further configured to receive a denial message from the network element via a media access control (MAC) control element (CE) in response to the switching notification sent from the UE to the network element, wherein the denial message prohibits the UE from using the upcoming switching occasion indicated in the switching notification, wherein the denial message is received at the UE during scheduling congestion at the network element.

11. The apparatus of claim 10, wherein the one or more processors are further configured to:
  receive a notification from the network element after the scheduling congestion has reduced, the notification indicating that the UE is permitted to select switching occasions; and
  send an additional switching notification to the network element.

12. An apparatus of a radio base station operable to assist a user equipment (UE) in performing carrier measurements in a wireless network, the apparatus comprising:
  memory; and
  one or more processors configured to:
    send, to the UE, switching parameters that indicate possible switching occasions for the UE, wherein the UE is configured to switch a radio frequency (RF) to another carrier frequency during the possible switching occasions in order to start performing the carrier measurements or stop performing the carrier measurements, wherein the switching parameters include a measurement gap period indicating a periodicity of the possible switching occasions, a measurement gap offset indicating an offset relative to a system frame number, and a measurement advance parameter that defines a number of subframes in advance that the UE is to notify the network element before using an upcoming switching occasion; and
    receive, from the UE, a switching notification that indicates the upcoming switching occasion from the possible switching occasions is selected by the UE, wherein the switching notification is received in conjunction with a measurement value that indicates to the radio base station one or more of: selected carriers for which the UE is to start performing the carrier measurements after an occurrence of the upcoming switching occasion or selected carriers for which the UE is to stop performing the carrier measurements after the occurrence of the upcoming switching occasion.

13. The apparatus of claim 12, wherein the one or more processors are further configured to:
    send a denial message to the UE indicating that the UE is barred from switching between carriers when the upcoming switching occasion occurs due to congestion, wherein the denial message is sent to the UE via a media access control (MAC) control element (CE); and
    send an additional message via an additional MAC CE to the UE when the congestion has reduced and the UE is now permitted to send switching notifications to the radio base station.

14. The apparatus of claim 12, wherein the one or more processors are configured to send the switching parameters indicating the possible switching occasions to the UE via radio resource control (RRC) signaling.

15. The apparatus of claim 12, wherein the one or more processors are configured to send the switching parameters indicating the possible switching occasions to the UE when the UE enters a coverage area of a cell in the wireless network.

16. The apparatus of claim 12, wherein the one or more processors are configured to receive the switching notification from the UE via a media access control (MAC) control element (CE).

17. The apparatus of claim 12, wherein the one or more processors are configured to receive the switching notification from the UE via radio resource control (RRC) signaling.

18. The apparatus of claim 12, wherein the one or more processors are configured to receive the switching notification from the UE via a physical uplink control channel (PUCCH) or a physical uplink shared channel (PUSCH).

19. At least one non-transitory machine readable storage medium having instructions embodied thereon for performing carrier measurements at a user equipment (UE), the instructions when executed using one or more processors performs the following:
  receiving, at the UE, switching parameters from a network element that indicate possible switching occasions for the UE, wherein the UE is configured to switch a radio frequency (RF) to another carrier frequency during the possible switching occasions in order to start performing the carrier measurements or stop performing the carrier measurements, wherein the switching parameters include a measurement gap period indicating a periodicity of the possible switching occasions, a measurement gap offset indicating an offset relative to a system frame number, and a measurement advance parameter that defines a number of subframes in advance that the UE is to notify the network element before using an upcoming switching occasion; and
  sending, from the UE, a switching notification to the network element that indicates the upcoming switching occasion from the possible switching occasions is selected by the UE, wherein the switching notification is sent in conjunction with a measurement value that indicates to the network element one or more of: selected carriers for which the UE is to start performing the carrier measurements after an occurrence of the upcoming switching occasion or selected carriers for which the UE is to stop performing the carrier measurements after the occurrence of the upcoming switching occasion.

20. The at least one non-transitory machine readable storage medium of claim 19, further comprising instructions which when executed by the one or more processors performs the following: sending the switching notification to the network element using a media access control (MAC) control element (CE) or via radio resource control (RRC) signaling.

21. The at least one non-transitory machine readable storage medium of claim 19, wherein the UE uses the upcoming switching occasion to switch to a receive path not currently being used for data reception in order to perform the carrier measurements for one or more carriers using that receive path.

* * * * *